June 14, 1966  P. N. RENZI  3,256,001
GAS SCRUBBER

Filed May 9, 1963  2 Sheets-Sheet 1

INVENTOR.
PETER N. RENZI
BY Frank J. Jordan
ATTORNEY

June 14, 1966   P. N. RENZI   3,256,001
GAS SCRUBBER
Filed May 9, 1963   2 Sheets-Sheet 2
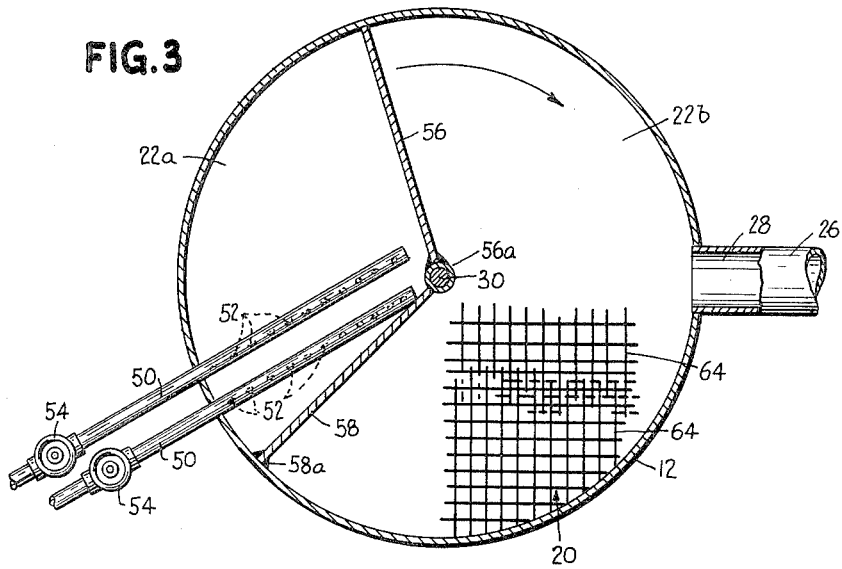
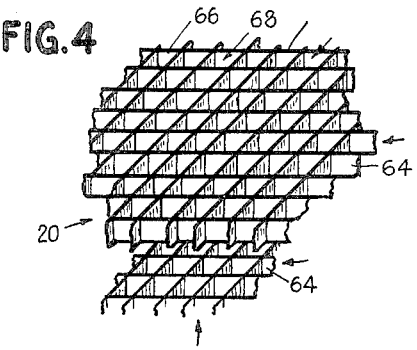
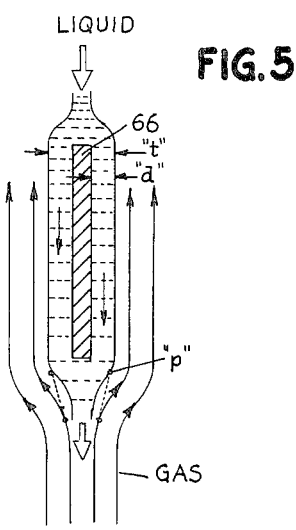
INVENTOR
PETER N. RENZI
BY *Frank J. Gordon*
ATTORNEY

United States Patent Office 3,256,001
Patented June 14, 1966

3,256,001
GAS SCRUBBER
Peter N. Renzi, Mountainside, N.J., assignor to American Radiator & Standard Sanitary Corporation, New York, N.Y., a corporation of Delaware
Filed May 9, 1963, Ser. No. 279,180
1 Claim. (Cl. 261—83)

This invention relates to a gas scrubber for removing particulate matter from air or gas streams by bringing the latter into intimate contact with a liquid as the air or gas stream passes through collector packing.

In one known type of gas scrubber, the particles are removed from the gas stream by directing a particle laden gas stream through a collector packing arrangement such that the particles are impacted against the surfaces of the collector packing. By providing such surfaces with a coating of liquid, the latter will capture particles thereby retaining them on the surfaces of the packing. In this known type of gas scrubber, the liquid used to coat the packing surfaces also serves to wash off the collected solids from such surfaces into a basin or sump.

However, the required liquid rate for effective washing of the surfaces is generally higher than the flow rate required merely to coat the surfaces of the packing with a liquid layer of sufficient thickness to capture and retain the solid particles. The requirement for the higher liquid flow rates for washing also results in certain disadvantages such as the liquid being entrained by the gas and carried by the latter in to other parts of the gas system where it may adversely affect equipment operation as by causing corrosion or erosion of structural elements. In addition, as will be hereinafter further described with reference to the drawings, high liquid flow rates for washing will increase the thickness of liquid or collector elements which in turn reduces the effectiveness of the collector packing for small diameter particles.

According to the present invention the aforementioned difficulties are avoided by providing a housing in which collector packing elements are rotated past a liquid spraying device, and wherein the spraying device is isolated from the main path of gas flow to prevent entrainment of the liquid within the gas while at the same time permitting the sprayed liquid to drain from the packing to provide a thin adhering film of liquid thereon as the packing elements are rotated from adjacent the isolated spray area to the main path of gas flow.

Accordingly, it is an object of the present invention to provide an apparatus for scrubbing gas in which relative movement is provided between a packing and a spray area which is isolated from the main path of gas flow such that entrainment of the sprayed liquid in the flowing gas stream is avoided.

Another object is to spray the surfaces of a rotating collector packing such that the liquid from the spray is allowed to drain to provide a thin adhering film thereon as such surfaces are exposed to the main stream of gas flow.

A further object is to provide an apparatus for scrubbing gas in which a plenum chamber with baffle means arranged therein are adjustable to thereby maintain substantially constant gas velocity through a collector or packing regardless of the load on the gas scrubber.

Other objects and features of the invention will appear as the description of the particular physical embodiment selected to illustrate the invention progresses.

For a better understanding of the present invention reference should be had to the accompanying drawings, wherein like numerals of reference indicate similar parts throughout the several views and wherein:

FIGURE 3 is a sectional view taken along 3—3 shown in FIGURE 1.

FIGURE 4 is a partial perspective view of a packing arrangement which may be used in the gas scrubber shown in FIGURE 1.

FIGURE 5 is an enlarged cross-sectional view of one of the packing elements of FIGURE 4 showing a liquid film on the element and the path of dust particles and gas flow.

Figure 2:
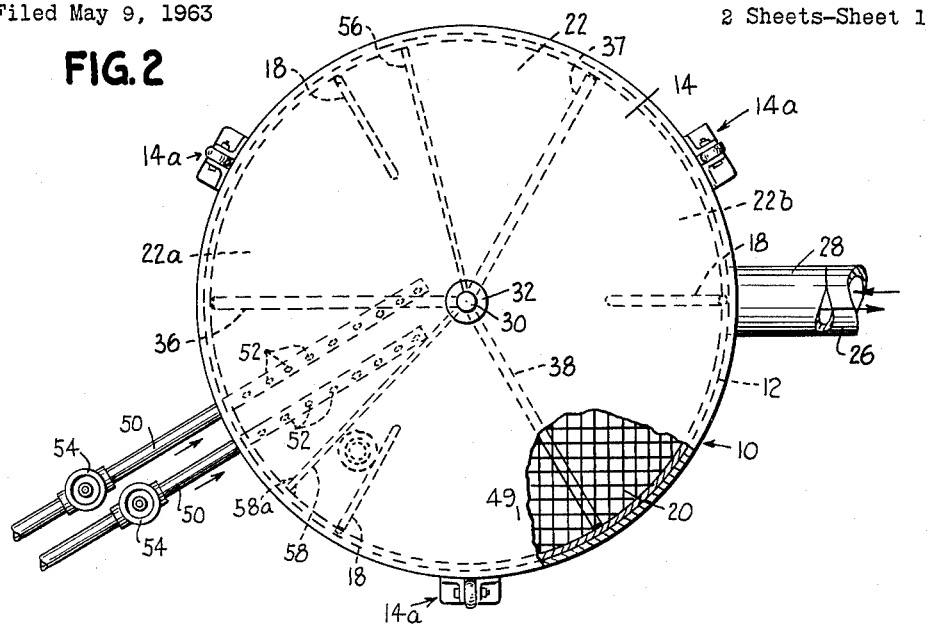
FIGURE 2 is a plan view, partly broken away, of the gas scrubber shown in FIGURE 1.
Figure 1:
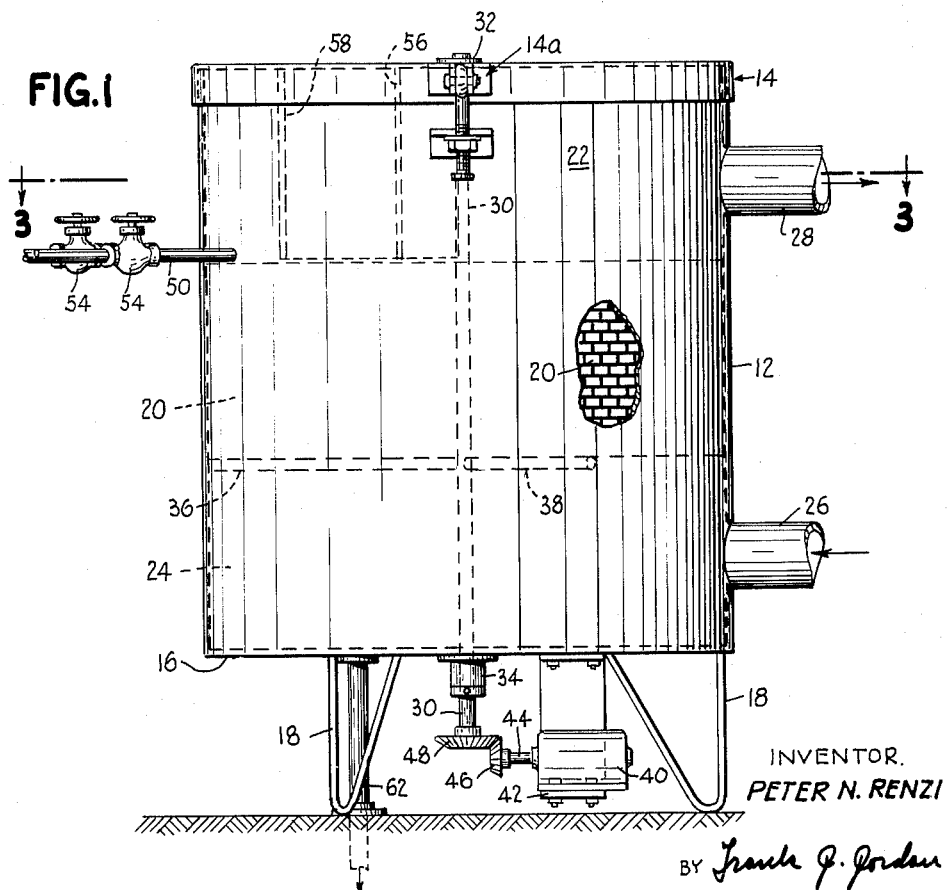
FIGURE 1 is an elevational view of a gas scrubber constructed according to the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed is for the purpose of description and not of limitation.

Referring to the drawings, a housing 10 is shown as comprising a generally cylindrical side wall 12, closed off by a removable cover 14 and a bottom wall 16, respectively. The cover 14 may be attached to the housing 10 by clamping means 14A. Suitable support feet 18 may be provided to support the housing 10 in an elevated upright position.

Within the housing 10 at a position spaced from the cover 14 and bottom wall 16, is an arrangement of collector packing 20 having a generally overall cylindrical configuration and arranged within the housing 10 such that a space between the cover 14 and the collector packing 20 defines an outlet plenum chamber or compartment 22 and a space between the bottom wall 16 and the packing 20 defines an inlet plenum chamber or compartment 24. Accordingly, an inlet fitting 26 in communication with the inlet plenum chamber 24 will allow a main gas stream containing particulate matter to pass into the inlet plenum chamber 24, pass up through the interstices of the packing 20 to the outlet plenum chamber 22, and exit from the latter through an outlet fitting 28. The cylindrical arrangement of collector packing 20 extends closedly adjacent the cylindrical side wall 12 to thereby eliminate short circuiting of the gas stream and insuring that the main gas stream will pass through the interstices of the collector packing 20 in its transit from the inlet fitting 26 to the outlet fitting 28.

For reasons to be hereinafter further described, means are provided for effective relative movement between the packing 20 within the housing 10 and a baffle and spray means hereinafter described. For purposes of illustration only I have shown how the packing may be rotated relative to the baffle and spray means. Such means may comprise a shaft 30 rotatably supported in a bearing 34 in the bottom housing wall 16 and bearing 32 in the cover 14. Alternatively, the bearing 32 may be supported by means (not shown) extending from the side wall 12.

The packing 20 is mounted to rotate with the shaft 30 and accordingly suitable means are provided to transmit rotational movement of the shaft 30 to the packing 20. Such means may comprise a plurality of spider arms 36, 37, 38 secured to the shaft 30 and extending radially therefrom such that the packing 20 is supported by the arms for rotation with the shaft 30. Alternatively, a perforated plate (not shown) centrally attached to the shaft 30 may be used in place of the spider arms.

Drive means for rotating the shaft 30 may comprise an electric motor 40 supported from the underside of the housing 10 by a bracket 42 suitably secured to the housing bottom wall 16. The motor shaft 44 drives a gear 46 which in turn meshes with a mating gear 48 carried on a portion of the shaft 30 extending through the bottom wall 16. With the above described arrangement, it can be seen that as the motor 40 drives the shaft 44, the packing 20 will rotate within the housing 10 in a direction indicated by the arrow in FIGURE 3.

In order to wash and to apply a thin coating of liquid to the surfaces of the collector packing 20, spray means are provided to direct a liquid stream onto the surfaces of the packing 20 as the latter rotates. Such spray means may comprise spray conduits 50 extending into the housing 10 at a position above the packing 20 and provided with a plurality of spray outlets, such as the openings 52, for directing a liquid spray downward onto the surfaces of the packing 20. Suitable control means such as the valves 54 are provided in the conduits 50 to control the spray of liquid onto the packing 20.

In order to isolate the spray means from the main path of gas flow through the housing 10 so that liquid spray will not be entrained in the gas flow, baffle means are provided in the outlet plenum chamber 22. Such baffle means may comprise a pair of baffles or partitions 56 and 58 arranged to divide the outlet plenum chamber 22 into a spray area 22a and a gas zone area 22b. The spray area 22a, that is the area adajcent the packing wherein the spray is introduced, is isolated by the baffles 56, 58 from the gas zone or chamber 22b, that is the portion of the plenum chamber 22 through which the gas transits in passing from the packing 20 to the outlet fitting 28. It can be seen therefore, that the baffles 56, 58 are arranged such that the tendency of liquid from the spray area 22a being entrained with the outgoing gases in the gas zone 22b is avoided.

One of the baffles, for example 58, may be mounted in a fixed position, such as by supporting it in a radial disposition from the upright cylindrical side wall 12, by the weld 58a. The other baffle 56 may be pivotally mounted about the shaft 30 by means of sleeve 56a such that its position may be changed to increase and decrease the volume of the gas zone 22b and the spray 22a. Thus the shaft 30 is allowed to rotate within the sleeve 56a without affecting the radial position of the baffle 56, the latter being adjusted to the desired position merely by pivoting it about the shaft 30 to the desired position.

The operation of the above described gas scrubber is as follows. Particle laden gas enters the inlet plenum chamber 24 through the inlet fitting 26 and then passes upwardly through the interstices of the collector packing 20 while the particulate matter in the gas is collected on the surface of the packing due to the impacting of the particles on the wet surfaces of the packing. With the packing rotating as previously described, the particles will be washed from the surfaces of the packing as the latter passes under the spray conduits 50.

It will be noted that the spray conduits 50 are located in the spray area 22a such that the sections of packing 20 will be exposed to the liquid spray just after passing beneath the stationary baffle 58. Consequently, as the packing rotates further, an area of the packing which has just been sprayed will continue to underlie the spray area 22a, but not the spray conduits 50, until such area passes underneath the baffle 56. Accordingly, in moving from a position underlying the spray conduits 50 to a position underlying the baffle 56, a section of packing 20 will be allowed to drain so that when such section does pass beyond the baffle 56 to enter the gas zone 22b, only a thin adhering film of liquid will remain thereon. It can be seen therefore, that collection, washing and draining will occur in cyclic manner as the collector packing continues to rotate. The sprayed liquid and the particles washed off from the surfaces of the packing are collected in the inlet chamber 24 and drained therefrom through a drain outlet fitting 62.

During reduced load operation of the gas scrubber, when the gas flow rate may be materially reduced, constant gas velocity may be maintained through the collector packing 20 by moving the baffle 56 to a position closer to the outlet fitting 28. In this manner, the sector of packing underlying the gas zone 22b may be reduced in proportion to the reduced gas flow and constant gas velocity through the packing will result due to the reduced flow area in the packing exposed to the reduced flow rate. Similarly, when the flow rate to the gas scrubber is increased, the baffle 56 may be moved to a position further away from the outlet fitting 28 to thereby increase the flow area in the packing exposed to the increased flow rate.

In this regard it is pointed out that studies have indicated that very small particles, for example less than one micron, can be efficiently collected by impaction against a solid object if the solid object is very thin, as hereinafter further described, and the gas velocities are sufficiently high. Accordingly, the provision of the adjustable baffle means makes it possible to maintain the required relatively high gas velocity for various flow rates to the gas scrubber.

Various types of packing may be used in the gas scrubber of the present invention. An example of one type which may be used is shown in FIGURE 4, as comprising a plurality of layers 64 of cellular structures arranged one upon the other such that adjacent layers are offset to provide a plurality of leading edges to the gas as it passes through succeeding layers. Each layer 64 may be comprised of interconnected members or elements 66 defining cells 68 therebetween, such cells 68 defining the interstices through which the gas passes while the elements 66 define the surface against which the particles are impacted as the gas travels through the offset cells 68 of superimposed layers 64. This type of packing is further described in my copending applications Serial No. 39,266, filed June 28, 1960, and Serial No. 255,952, filed February 4, 1963.

As previously set forth, high liquid flow rates for washing will increase the thickness of liquid or collector elements which in turn reduce the effectiveness of the collector packing for small diameter particles. Considering the packing shown in FIGURE 4, for example, the collector elements 66 are essentially thin slats arranged in alignment with the gas flow. A can best be seen in FIGURE 5, which is an enlarged cross-sectional view of one of these elements, liquid runs down the sides of the element 66 and, ignoring the direct impingement effect on the first layers of packing immediately below the spray means, the more liquid that must flow downward along the sides of the element 66, the greater must be the depth "d" (FIGURE 5) of the liquid. The thickness "t" of the collector or "target" is the sum of the thickness of the collector element 66 and the liquid film on each side of the element 66. It is this thickness "t" which forces the gas flow to diverge as shown in FIGURE 5. Some of the particles "p," dust for example, in the gas stream, air for example, having greater inertia than the molecules of gas, will continue on, instead of being diverted along with the gas stream, until they strike this "target" and are thereby captured by the liquid.

According to the present invention, the thickness "t" of the "target" can be reduced by the provision of the separate regions for washing, draining and particle collection since as previously set forth, although high liquid flow rates for washing may be used, the liquid is allowed to drain from the collector elements as the latter passes from adjacent the spray means to the main path of gas flow such that a thin adhering film of liquid is provided on the collector elements.

A thin collector or "target" is better than a thick one for collecting very small particles since the divergence of the gas stream is so slight in the case of thin collectors, that most of the particles will collide with the collector. If the collector is thick, the flow diverges significantly and only the heavy (high inertia) particles will continue on to collide with the collector. Mathematical analysis of the trajectory of particles of dust in an air stream passing over collectors having various thickness, .001 inch to .003 inch for example, has shown that collection efficiency increases markedly with decrease in collector thickness.

Although the illustrated embodiment shows the liquid spray being introduced into the packing in a direction opposite to the direction of gas flow, it is to be understood that the spray and gas flow may be in the same direction. From the foregoing description it will be evident that the packing may remain stationary and the spray and baffle means rotated to effect relative movement between the same. In such case, one or more of the gas ducts could be coaxial with the axis of rotation of the spray and baffle means. A shield structure traveling with the baffle means would seal off the spray area from the gas flow areas.

From the above description it will be evident that in the gas scrubber of the present invention, entrainment of liquid spray in the gas flowing through the gas scrubber is avoid, a thin adhering film of liquid is provided on the surfaces of the packing as such surface are exposed to the gas passing through the gas scrubber, and the velocity of the gases flowing through the packing may be maintained at a constant rate.

The invention hereabove described may be varied in construction within the scope of the claim, for the particular device selected to illustrate the invention is but one of many possible embodiments of the same. The invention, therefore, is not to be restricted to the precise details of the structure shown and described.

What is claimed is:

A gas scrubber comprising a generally cylindrical upright housing having a cylindrical sidewall, and top and bottom walls; cylindrical packing arranged in said housing in spaced relation to the top and bottom walls for thus cooperating therewith in defining upper and lower compartments; means operatively connected with said packing for rotating same around its central vertical axis; a first fixed vertical partition radiating from the central axis of the housing to the housing sidewall in the space between the upper surface of the packing and the housing top wall; a second vertical partition radiating from the central axis of the housing to the housing sidewall in the space between the upper surface of the packing and the housing top wall; said partitions spanning the space between the upper surface of the packing and the housing top wall and cooperating with one another to define a spray chamber of sector shape; the portion of the upper compartment outside the spray chamber defining a clean gas outlet chamber; liquid spray means extending into said spray chamber for spraying liquid onto the packing as said packing rotates therepast; said spray means being disposed closely adjacent the first partition and remote from the second partition, and the packing being movable from the first partition toward the second partition as it traverses the spray chamber so that sprayed liquid is allowed to drain through the packing into the lower compartment while the sprayed portions of the packing are moving toward the second partition; means for admitting dirty gas into the lower compartment; means for exhausting clean gas from the clean gas outlet chamber whereby the gas flows upwardly through the packing as it proceeds from the lower compartment to the outlet chamber; and means mounting the second partition for adjusting movements about the housing vertical axis whereby to vary the amount of packing surface exposed to the upwardly flowing gas stream to maintain a substantially constant linear gas velocity in spite of varying volumetric gas flow rates.

References Cited by the Examiner

UNITED STATES PATENTS

| | | | |
|---|---|---|---|
| 2,337,907 | 12/1943 | Lundstrom | 165—7 |
| 2,662,759 | 12/1953 | Brewer | 261—83 |
| 2,695,773 | 11/1954 | McGrath | 261—111 X |
| 2,809,818 | 10/1957 | Munters | 261—24 |
| 3,065,956 | 11/1962 | Meek | 261—83 X |

FOREIGN PATENTS 368,492   3/1932   Great Britain.

ROBERT F. BURNETT, *Primary Examiner.*

HARRY B. THORNTON, *Examiner.*

D. DENENBERG, L. H. McCARTER,
*Assistant Examiners.*